(12) United States Patent
Doerr

(10) Patent No.: US 6,922,507 B2
(45) Date of Patent: Jul. 26, 2005

(54) LOW-LOSS INTEGRATED OPTICAL COUPLER AND OPTICAL SWITCH

(75) Inventor: Christopher Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 9 days.

(21) Appl. No.: 10/378,411

(22) Filed: Mar. 3, 2003

(65) Prior Publication Data

US 2003/0165295 A1 Sep. 4, 2003

Related U.S. Application Data

(60) Provisional application No. 60/360,702, filed on Mar. 1, 2002.

(51) Int. Cl.$^7$ ................................................ G02B 6/26
(52) U.S. Cl. ............................ 385/39; 385/30; 385/37
(58) Field of Search ............................... 385/30, 37, 39

(56) References Cited

U.S. PATENT DOCUMENTS 6,501,875 B2 * 12/2002 Zhao et al. .................... 385/30
6,556,746 B1 * 4/2003 Zhao et al. .................... 385/30
6,597,833 B1 * 7/2003 Pi et al. ......................... 385/30

OTHER PUBLICATIONS

"Mach–Zehnder Interferometer Type Optical Waveguide Coupler With Wavelength–Flattened Coupling Ratio," K. Jinguji et al., Electronics Letters, Aug. 16, 1990, vol. 26, No. 17, pp. 1326–1327.

"Design Rules for Maximally Flat Wavelength–Insensitive Optical Power Dividers Using Mach–Zehnder Structures," B. E. Little and T. Murphy, IEEE Photonics Technology Letters, vol. 9, No. 12, Dec. 1997, pp. 1607–1609.

* cited by examiner

*Primary Examiner*—John R. Lee
*Assistant Examiner*—Paul M. Gurzo

(57) ABSTRACT

A low-loss integrated optical coupler includes at least three substantially similar optical couplers, adjacent ones of the optical couplers interconnected via at least one set of waveguides, each of the sets of waveguides comprising a path-length difference between the waveguides therein. In one embodiment of the present invention, the multi-section optical coupler comprises at least two arms and the path-length differences are adjustable such that signals traversing the at least two arms undergo a relative phase shift, such that a desired output power splitting ratio for the multi-section optical coupler is achieved. Alternatively, the optical coupler is implemented in an inventive optical device that functions at least, as an optical switch or an optical splitter.

10 Claims, 3 Drawing Sheets

LOW-LOSS INTEGRATED OPTICAL COUPLER AND OPTICAL SWITCH

CROSS-REFERENCE TO RELATED APPLICATIONS

This patent application claims the benefit of U.S. Provisional Application Ser. No. 60/360,702 filed Mar. 1, 2002, which is incorporated herein by reference in its entirety.

FIELD OF THE INVENTION

This invention relates to the field of optical couplers, switches and power splitters and, more specifically, to low-loss integrated optical couplers, optical switches and optical power splitters.

BACKGROUND OF THE INVENTION

Optical couplers, optical switches, such as 1×2 optical switches, and optical power splitters are needed in many optical applications. For instance, one can combine arrays of 1×2 optical switches to make optical cross-connect switch fabrics. It is especially advantageous if these optical switches are integrated onto the same substrate, saving cost, size, and loss and as such may be embedded in integrated networks of optical interconnections. These optical switches should have low loss and maintain good characteristics in the presence of wavelength, polarization, and fabrication (WPF) changes. Similarly, optical power splitters should also have low loss and maintain good characteristics in the presence of wavelength, polarization, and fabrication (WPF) changes.

There are two main characteristics of 1×2 optical switches that are sensitive to WPF changes. The first characteristic is the switching extinction ratio for both outputs, i.e., when the light is switched to output port 1, how much light leaks into output port 2 and vice versa. The second characteristic is the bias point of the switch, i.e., when no electrical power is applied, how accurately is the switch in one of the switch states.

Typically, in electro-optic and polymer materials, the preferred 1×2 optical switch configuration is usually the "Y" switch configuration. This has an accurate power-off state, but often a poor extinction ratio. "Y" switches consume high electrical power when operated thermo-optically in silica waveguides, and so are limited to only materials like $LiNbO_3$, InP, and polymers.

The other main configuration choice for a 1×2 optical switch is the Mach-Zehnder interferometer (MZI) switch configuration. This configuration consists of two couplers connected by two waveguides, one or both waveguides containing phase shifters. Changing the phase difference between the two waveguide arms by 180° causes the optical switch to alternate from one state to the other. The MZI switch typically has a significantly lower thermo-optic power consumption than the "Y" switch. Conventionally, MZI switches comprise either two multi-mode interference (MMI) couplers or two evanescent couplers. However, MMI couplers have significant loss, resulting in a 1×2 optical switch with typically 1.2 dB loss in silica waveguides. In addition, the power splitting ratio of the evanescent couplers is highly sensitive to WPF changes, and as such the switch extinction ratio for at least one of the ports is highly WPF sensitive.

There are also two main characteristics of optical splitters sensitive to WPF changes. The first is the splitting ratio of the optical splitter. The second is the loss of the optical splitter. Conventional optical splitters may implement evanescent couplers because of the low loss associated with these types of couplers. However the splitting ratio of conventional evanescent couplers is highly sensitive to WPF changes and the ratio cannot be readily electrically adjusted in non-electro-optic materials, such as silica waveguides.

SUMMARY OF THE INVENTION

The present invention advantageously provides a low-loss integrated optical coupler. Alternatively, the optical coupler is implemented in an inventive optical device that functions at least, as an optical switch or an optical splitter.

In one embodiment of the present invention, a multi-section optical coupler includes at least three substantially similar optical couplers, adjacent ones of the optical couplers interconnected via at least one set of wavegudes, each of the sets of waveguides comprising a path-length difference between the waveguides therein. The multi-section optical coupler comprises at least two arms and the path-length differences are adjustable such that signals traversing the at least two arms undergo a relative phase shift, such that a desired output power splitting ratio for the multi-section optical coupler is achieved.

In another embodiment of the present invention an optical device includes a Y-branch input coupler comprising at least one input port and at least two branches, a Mach-Zehnder interferometer (MZI) in optical communication with the Y-branch coupler, and an output multi-section optical coupler comprising at least two substantially similar optical couplers, adjacent ones of the optical couplers interconnected via at least one set of wavegudes, each of the sets of waveguides comprising a path-length difference between the waveguides therein, wherein the optical device comprises at least two arms, each of the arms comprising at least one output port, and includes means for causing portions of an input signal traversing the at least two arms to undergo a relative phase shift, such that an output signal is split between the output ports of the optical device.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although various embodiments of the present invention herein are being described with respect to a three-section coupler, a 1×2 optical switch and a 1×2 optical splitter, the concepts of the present invention may be applicable in various other configurations and components, such as optical switches comprising a plurality of combinations of inputs and outputs, optical power splitters comprising a plurality of combinations of inputs and outputs, and optical selectors, to name a few.

Figure 1:
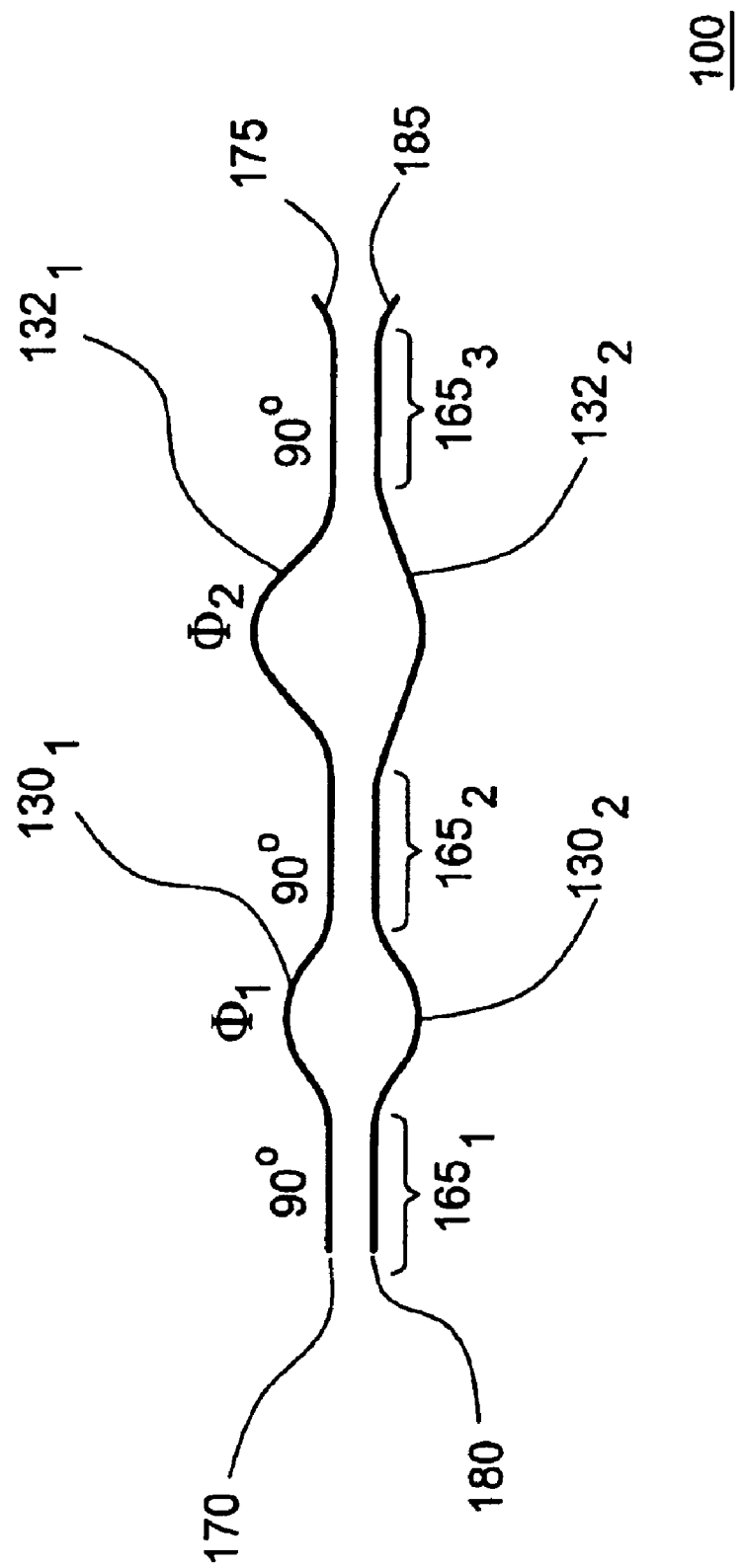
FIG. 1 depicts a high level block diagram of an embodiment of a multi-section optical coupler in accordance with the present invention.

FIG. 1 depicts a high level block diagram of an embodiment of a multi-section optical coupler in accordance with the present invention. The multi-section optical coupler 100 of FIG. 1 illustratively comprises three evanescent couplers $165_1$, $165_2$ and $165_3$ (collectively evanescent couplers 165). The three evanescent couplers 165 are interconnected by two sets of two waveguides $130_1$, $130_2$, and $132_1$, $132_2$ comprising relative path length differences corresponding to phase differences $\phi_1$ and $\phi_2$, respectively, at a center wavelength of interest.

The three evanescent couplers 165 are substantially similar. The evanescent couplers 165 are all substantially equal in length and each comprises a nominal 90° phase shift between their local eigenmodes. The multi-section optical coupler 100 further comprises an upper branch 170 with an output port 175 and a lower branch 180 with an output port 185. Although in FIG. 1, the multi-section optical coupler 100 is depicted as comprising evanescent couplers 165, other couplers having similar properties, such as adiabatic couplers, may be implemented within a multi-section optical coupler in accordance with the present invention. Furthermore, although in FIG. 1 the multi-section optical coupler 100 is depicted as comprising three couplers, other numbers of couplers may be implemented within a multi-section optical coupler in accordance with the present invention.

Because the three evanescent couplers 165 are substantially similar, the couplers 165 change in substantially the same manner in the presence of WPF changes, giving the multi-section optical coupler 100 high WPF tolerance. A desired power splitting ratio for the multi-section optical coupler 100 is obtained by adjusting the relative phases of $\phi_1$ and $\phi_2$. The values of $\phi_1$ and $\phi_2$ are adjusted by varying the relative path lengths between the waveguides of the two sets of two waveguides $130_1$, $130_2$, and $132_1$, $132_2$ interconnecting the three evanescent couplers 165, respectively. That is, by changing the length of waveguide $130_1$ with respect to waveguide $130_2$, the value of $\phi_1$ is altered. Similarly, by changing the length of waveguide $132_1$ with respect to waveguide $132_2$, the value of $\phi_2$ is altered. Alternatively, the power splitting ratio may be tuned by adjusting $\phi_1$ and/or $\phi_2$ with a means for causing a phase shift such as for example, tunable phase shifters, such as thermo-optic phase shifters or filters (not shown), located within at least one of the waveguides of each of the two sets of two waveguides $130_1$, $130_2$, and $132_1$, $132_2$ interconnecting the three evanescent couplers 165. In the present invention, the path lengths between the waveguides of the two sets of two waveguides $130_1$, $130_2$, and $132_1$, $132_2$ may be on the order of an optical wavelength of an optical signal traversing the set of waveguides. Specific values for $\phi_1$ and $\phi_2$ are determined to obtain a desired power splitting.

For example if the inputs to the multi-section coupler 100 are $u_1$ and $u_2$ (the complex amplitudes of the fields of an input signal), then the outputs $v_1$ and $v_2$ are characterized according to equation one (1), which follows.

$$\begin{bmatrix} v_1 \\ v_2 \end{bmatrix} = \frac{1}{2\sqrt{2}} \begin{bmatrix} \cos(\theta/2) & j\sin(\theta/2) \\ j\sin(\theta/2) & \cos(\theta/2) \end{bmatrix} \begin{bmatrix} e^{j\phi_2} & 0 \\ 0 & 1 \end{bmatrix} \begin{bmatrix} \cos(\theta/2) & j\sin(\theta/2) \\ j\sin(\theta/2) & \cos(\theta/2) \end{bmatrix}$$
$$\begin{bmatrix} e^{j\phi_1} & 0 \\ 0 & 1 \end{bmatrix} \begin{bmatrix} \cos(\theta/2) & j\sin(\theta/2) \\ j\sin(\theta/2) & \cos(\theta/2) \end{bmatrix} \begin{bmatrix} u_1 \\ u_2 \end{bmatrix}$$
(1)

where $\theta$ is the accumulated phase difference between the eigenmodes in each of the evanescent couplers 165. WPF changes affect the evanescent couplers 165 the most, with almost no effect on $\phi_1$ or $\phi_2$. Thus if $\theta = \sigma/2 + 2\Delta$, where $\Delta \ll 1$, ($\Delta$ depicting the change in phase in $\phi_1$ and $\phi_2$ due to WPF changes) then equation (1) is rewritten according to equation (2), which follows:

$$\begin{bmatrix} v_1 \\ v_2 \end{bmatrix} =$$
(2)
$$\frac{1}{2\sqrt{2}} \begin{bmatrix} 1-\Delta & j+j\Delta \\ j+j\Delta & 1-\Delta \end{bmatrix} \begin{bmatrix} e^{j\phi_2} & 0 \\ 0 & 1 \end{bmatrix} \begin{bmatrix} 1-\Delta & j+j\Delta \\ j+j\Delta & 1-\Delta \end{bmatrix} \begin{bmatrix} e^{j\phi_1} & 0 \\ 0 & 1 \end{bmatrix} \begin{bmatrix} 1-\Delta & j+j\Delta \\ j+j\Delta & 1-\Delta \end{bmatrix} \begin{bmatrix} u_1 \\ u_2 \end{bmatrix}.$$

The coupling ration is characterized according to equation (3), which follows:

$$R = \frac{1}{8}|1 + e^{j\phi_2} - e^{j\phi_1} + e^{j\phi_1 + j\phi_2}|^2.$$
(3)

The power-splitting ratio is thus $R:(1-R)$. The WPF sensitivity (sensitivity to $\Delta$) of the coupling ration, R, is minimized according to equation (4), which follows:

$$[1+\cos\phi_2-\cos\phi_1+\cos(\phi_1+\phi_2)][-1-\cos\phi_2-3\cos\phi_1-\cos(\phi_1+\phi_2)]=-[\sin\phi_2-\sin\phi_1+\sin(\phi_1+\phi_2)][-\sin\phi_2-3\sin\phi_1-\sin(\phi_1+\phi_2)].$$
(4)

There are thus two equations, (3) and (4), for two variables, $\phi_1$ and $\phi_2$. The equations are transcendental and may be solved. Examples of solutions for $\phi_1$ and $\phi_2$ are listed in Table 1, which follows:

TABLE 1

| Coupling ratio | $\phi_1$ | $\phi_2$ |
| --- | --- | --- |
| 50/50 | 0° | 120° |
| 75/25 | 116.9° | 34.2° |
| 90/10 | 110.1° | 58.4° |
| 100/0 | 90° | 90° |

$\phi_1$ and $\phi_2$ can be interchanged and/or both multiplied by a negative one without affecting the coupling ratio (e.g., 117°, 33.70° and −117°, −33.7° and 33.7°, 117°, and −33.7°, −117° all give the same ratio). If one of the values of $\phi_1$ or $\phi_2$ is multiplied by a negative one however, the coupling ratio flips (e.g., 117°, 33.7° gives a 75/25 ratio, whereas 117°,−33.7° gives a 25/75 ratio). Also, the values of $\phi_1$ and $\phi_2$ may be slightly modified depending on whether the change in coupler ratio due to a WPF change, $\Delta$, is desired to be maximally flat or have some ripple.

A multi-section optical coupler in accordance with the present invention is capable of being constructed from planar waveguides according to well-known fabrication techniques. For example, according to one well-known fabrication technique, the waveguides are formed from glass layers deposited on the surface of a silicon substrate. A fabrication sequence includes the steps of oxidizing the silicon surface to provide a lower cladding layer, depositing a core layer of phosophosilicate glass, lithographically patterning the core layer to define the waveguide configuration, and depositing an upper core layer of phosophosilicate glass. Such a technique is discussed generally in U.S. Pat. No. 4,902,086, issued to C. H. Henry et al. on Feb. 20, 1990, which is herein incorporated by reference in its entirety.

Figure 2:
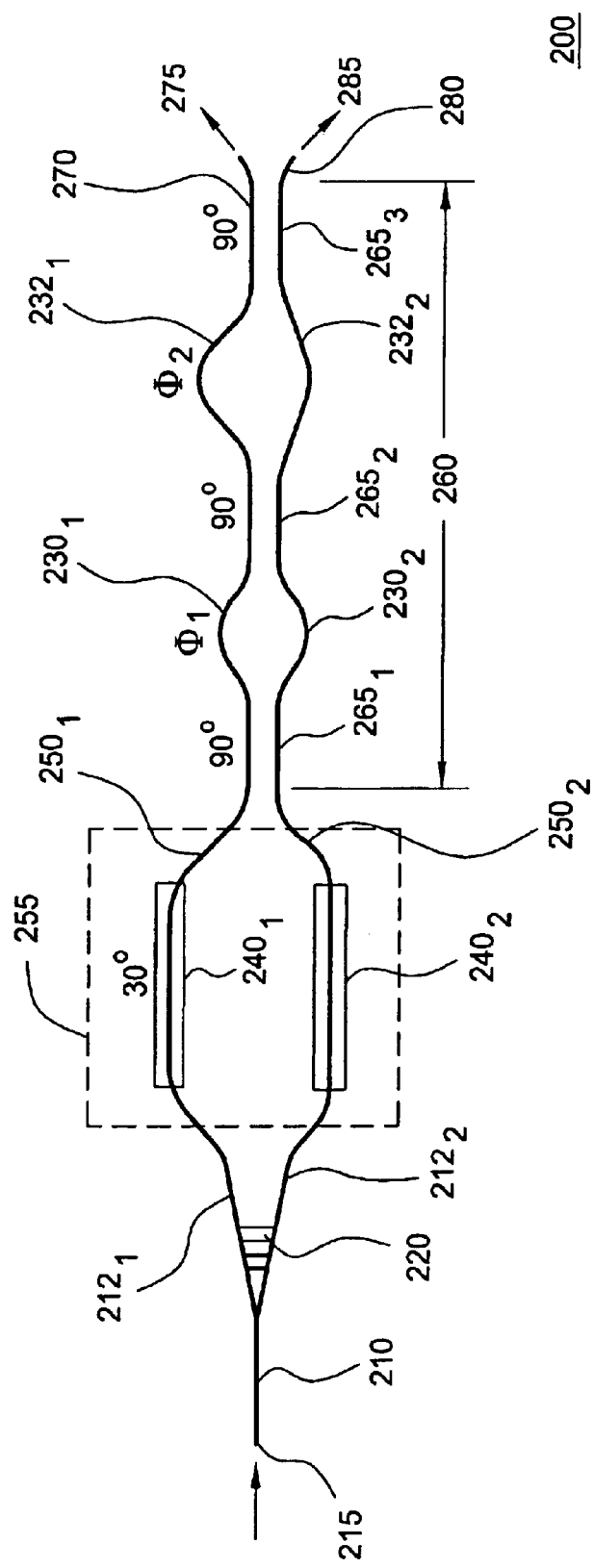
FIG. 2 depicts a high level block diagram of an inventive optical switch including an embodiment of a multi-section optical coupler in accordance with the present invention.

A multi-section optical coupler in accordance with the present invention, such as the multi-section optical coupler 100 of FIG. 1, may be used for comprising an inventive optical switch. For example, FIG. 2 depicts a high level block diagram of an inventive optical switch including an embodiment of a multi-section optical coupler in accordance with the present invention. The optical switch 200 of FIG. 2 comprises a Y-branch coupler 210 comprising an input port 215 and two branches $212_1$ and $212_2$ (collectively branches 212). A plurality of Y-branch segments (collectively Y-branch segments 220) are located substantially vertically between the branches of the Y-branch coupler 210. The Y-branch segments 220 are generally parallel to each other and transversely intersect the two branches 212 of the Y-branch coupler 210 and significantly reduce insertion loss. Such a technique for reducing insertion loss is generally discussed in U.S. Pat. No. 5,745,618, issued to Y. P. Li on Apr. 28, 1998, which is herein incorporated by reference in its entirety.

The optical switch 200 further comprises two waveguide arms one each following a respective branch $212_1$ and $212_2$ of the Y-branch coupler 210, and two phase shifting means, illustratively phase shifters $240_1$ and $240_2$ (collectively phase shifters 240), one each located in a respective one of the waveguide arms. The waveguide arms and the phase shifters 240 form two Mach-Zehnder interferometer (MZI) arms $250_1$ and $250_2$ (collectively Mach-Zehnder interferometer arms 250) of the MZI 255 of the optical switch 200.

As mentioned above, the optical switch 200 comprises a three-section coupler 260 substantially similar to the multi-section coupler 100 of FIG. 1. The three-section coupler comprises, illustratively, three evanescent couplers $265_1$, $265_2$ and $265_3$ (collectively evanescent couplers 265) following the MZI arms 250. The three evanescent couplers 265 are interconnected by two sets of two waveguides $230_1$, $230_2$, and $232_1$, $232_2$ comprising relative path length differences corresponding to phase differences $\phi_1$ and $\phi_2$, respectively, at a center wavelength of interest.

The three evanescent couplers 265 are substantially similar. Each of the evanescent couplers 265 are all substantially equal in length and each comprises a nominal 90° phase shift between their local eigenmodes. The three-section coupler 260 comprises an upper branch 270 with an output port 275, and a lower branch 280 with an output port 285. Although in FIG. 2, the three-section coupler 260 is depicted as comprising evanescent couplers 265, other couplers comprising similar properties, such as adiabatic couplers, may be implemented within the three-section coupler 260 of the present invention. Furthermore, although in FIG. 2 the MZI 255 is depicted as comprising phase shifters 240, various means, such as filters, of providing a phase shift to propagating optical signals are known in the art, and as such, it will be appreciated by those skilled in the art informed by the teachings of the present invention, that such other means may be implemented within the concepts of the present invention in place of the phase shifters illustrated in FIG. 2.

The Y-branch segments 220 of the optical switch 200 are comprised of segments of waveguide oriented substantially perpendicular to the input port 215 and located between the branches 212 of the Y-branch coupler 210. These segments 220 have a constant center-to-center spacing but decrease gradually in width as they approach the MZI arms 250. The Y-branch coupler 210 comprising the Y-branch segments 220 has very low input loss. The three-section coupler 260 comprising the evanescent couplers 265 also has very low loss. As such, the optical switch 200 also maintains a low total loss.

The Y-branch coupler 210, the MZI 255, and the evanescent couplers 265 comprising the optical switch 200 of FIG. 2 are capable of being constructed from planar waveguides according to well-known fabrication techniques. For example, according to one well-known fabrication technique, the waveguides are formed from glass layers deposited on the surface of a silicon substrate. A fabrication sequence includes the steps of oxidizing the silicon surface to provide a lower cladding layer, depositing a core layer of phosophosilicate glass, lithographically patterning the core layer to define the waveguide configuration, and depositing an upper core layer of phosophosilicate glass. Such a technique is discussed generally in U.S. Pat. No. 4,902,086, issued to C. H. Henry et al. on Feb. 20, 1990, which is herein incorporated by reference in its entirety.

The upper and lower branches of the optical switch 200 both comprise substantially similar means for causing phase shifts, illustratively the phase shifters 240, in order to maintain symmetry. By maintaining the upper and lower branches of the optical switch 200 symmetrical in this regard, it is possible to maintain a relative phase shift between the upper and lower branches of the optical switch that is substantially small when the optical switch is in its power-off (un-powered) state.

For example, in the optical switch 200 of FIG. 2, the phase difference between the two MZI arms $250_1$ and $250_2$ is illustratively 30 degrees (30°). As such, a 30° path-length bias is applied to the upper MZI arm $250_1$. With this configuration, a signal input to the optical switch 200 is directed to the upper MZI arm $250_1$ and subsequently to the upper output port 275 of the optical switch 200 during the power-off state. To switch the signal to the other output, either one or both of the phase shifters 240 is manipulated (driven) such that a first portion of an input signal traversing the upper arm of the optical switch 200 and a second portion of the input signal traversing the lower arm of the optical switch 200 experience a 180° relative phase shift.

In an alternate embodiment of the present invention, a bias of 60° is applied to the lower MZI arm $250_2$ to enable the operation of the optical switch 200 in a push-pull fashion. That is, an input signal is split 50/50 between the two output ports 275, 285 of the optical switch 200 during the power-off state. In such a case one phase shifter of the optical switch 200 is manipulated (driven) to switch an output signal to one of the output ports, and the other phase shifter is manipulated (driven) to switch an output signal to the other of the output ports.

The optical switch 200 is highly tolerant to wavelength, polarization, and fabrication (WPF) changes. The Y-branch coupler 210, itself, maintains a highly accurate power splitting ratio (50/50) and phase difference (zero) between its branches 212 regardless of WPF changes. The three-section coupler 260 also gives a highly accurate power splitting ratio (50/50).

An input optical signal to the optical switch 200 experiences very low loss in the Y-branch coupler 210. The input optical signal is split into two portions in the Y-branch coupler 210. A portion of the input optical signal propagates through the upper arm $250_1$ of the MZI 255 and the upper branch 270 of the three-section coupler 260 and a portion of the input optical signal propagates through the lower arm $250_2$ of the MZI 255 and the lower branch 280 of the three-section coupler 260 wherein the signals undergo relative phase shifts such that only one of the portions of the input optical signal is output through one of the output ports 275, 285 of the optical switch 200. The optical switch 200 of the present invention provides an integrated optical switch that comprises low thermo-optic power consumption, low loss, and high tolerance (i.e., low sensitivity) to wavelength, polarization, and fabrication (WPF) changes.

In an alternate embodiment of the present invention, the optical switch 200 of FIG. 2 is used as a power splitter with high tolerance to WPF changes. That is, a desired power splitting ratio is obtained by adjusting the values of $\phi_1$ and/or $\phi_2$ of the three-section coupler 260. The values of $\phi_1$ and/or $\phi_2$ may be adjusted, as described above with respect to the multi-section coupler 100 of FIG. 1, by varying the relative path lengths between the waveguides of the two sets of two waveguides $230_1$, $230_2$, and $232_1$, $232_2$ interconnecting the three evanescent couplers 265, respectively. Alternatively, the power splitting ratio may be tuned by adjusting $\phi_1$ and/or $\phi_2$ with a means for causing a phase shift such as for example, tunable phase shifters, such as thermo-optic phase shifters or filters (not shown), located within at least one of the waveguides of each of the two sets of two waveguides $230_1$, $230_2$, and $232_1$, $232_2$ interconnecting the three evanescent couplers 265. Values for $\phi_1$ and $\phi_2$ may be determined to obtain a desired power splitting ratio with WPF tolerance as described above with respect to the multi-section coupler 100 FIG. 1.

The optical switch 200 of FIG. 2 is capable of functioning as a 2×1 selector if input signals are input into the output ports 275, 285 (i.e., used in the opposite direction).

Figure 3:
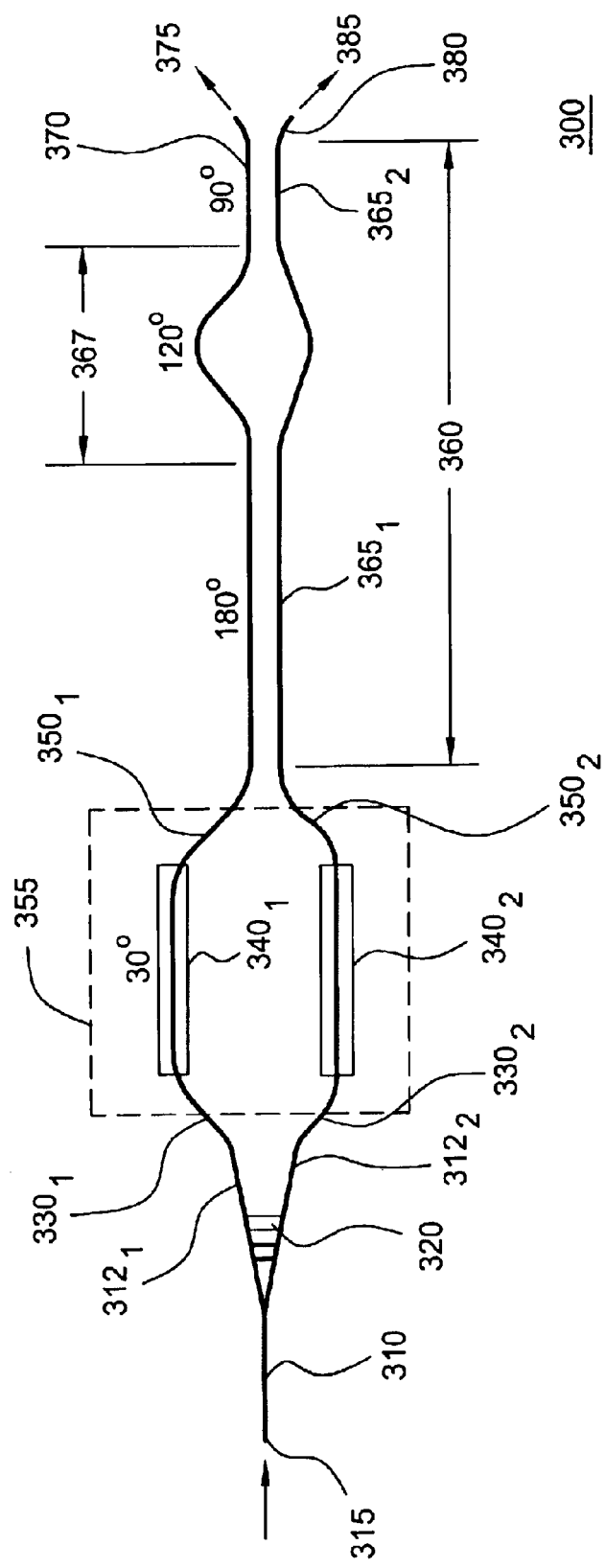
FIG. 3 depicts a high level block diagram of an alternate embodiment of an optical switch in accordance with the present invention.

FIG. 3 depicts a high level block diagram of an alternate embodiment of an inventive optical switch in accordance with the present invention. In the optical switch 300 of FIG. 3, the three-section coupler 260 of FIG. 2 is replaced with a two-section coupler 360. The optical switch 300 of FIG. 3 comprises a Y-branch coupler 310 comprising an input port 315 and two branches $312_1$, and $312_2$ (collectively branches 312). A plurality of Y-branch segments (collectively Y-branch segments 320) are located substantially vertically between the branches 312 of the Y-branch coupler 310. The Y-branch segments 320 are generally parallel to each other and transversely intersect the two branches 312 of the Y-branch coupler 310 and significantly reduce insertion loss.

The optical switch 300 further comprises two waveguide arms $330_1$ and $330_2$ (collectively waveguide arms 330), one each in optical communication with a respective branch $312_1$ and $312_2$ of the Y-branch coupler 310, and two phase shifting means, illustratively phase shifters $340_1$ and $340_2$ (collectively phase shifters 340), one each located in a respective one of the waveguide arms $330_1$ and $330_2$. The waveguide arms 330 and the phase shifters 340 form two Mach-Zehnder interferometer (MZI) arms $350_1$ and $350_2$ (collectively Mach-Zehnder interferometer arms 350) of the MZI 355 of the optical switch 300.

As mentioned above, the optical switch 300 comprises a two-section coupler 360 comprising, illustratively, two evanescent couplers $365_1$ and $365_2$ (collectively evanescent couplers 365) following the Mach-Zehnder interferometer arms 350. The two evanescent couplers 365 are interconnected in the middle at a bend section 367 by a set of two waveguides comprising path length differences. As illustrated in FIG. 3, the two-section coupler 360 comprises an upper branch 370 with an output port 375, and a lower branch 380 with an output port 385. Although in FIG. 3, the two-section coupler 360 is depicted as comprising evanescent couplers 365, other couplers comprising similar properties, such as adiabatic couplers, may be implemented within a two-section coupler 360 of an optical switch in accordance with the present invention. Furthermore, although in FIG. 3 the MZI 355 is depicted as comprising phase shifters 340, various means, such as filters, of providing a phase shift to propagating optical signals are known in the art, and as such, it will be appreciated by those skilled in the art informed by the teachings of the present invention, that such other means may be implemented within the concepts of the present invention in place of the phase shifters illustrated in FIG. 3.

In FIG. 3, the illustrated number of degrees is representative of the relative phase differences between local eigenmodes accumulated in each section. That is, the first evanescent coupler $365_1$ illustratively comprises a phase of 180°, the bend section 367 illustratively comprises a phase of 120°, and the second evanescent coupler $365_2$ illustratively comprises a phase of 90°.

For the optical switch 300 to maintain an optimum tolerance to WPF changes, the first evanescent coupler $365_1$ must be configured such that a phase shift in the first evanescent coupler $365_1$ is equal to twice the phase shift of the second evanescent coupler $365_2$. In the optical switch 300 of FIG. 3, however, this cannot be accomplished by simply making the length of the first evanescent coupler $365_1$ twice that of the second evanescent coupler $365_2$ because both evanescent couplers 365 comprise the same bends at the bend section 367 and, as such, WPF changes will affect each of the evanescent couplers 365 differently. As such, lengths for the evanescent couplers 365 must be determined such that the first evanescent coupler $365_1$ has a length greater than the second evanescent coupler $365_2$ and the phase shift of the first evanescent coupler $365_1$ is equal to twice the phase shift of the second evanescent coupler $365_2$.

The Y-branch segments 320 of the optical switch 300 are also comprised of segments of waveguide oriented perpendicular to the input port 315 and located between the branches 312 of the Y-branch coupler 310. These segments 320 have a constant center-to-center spacing but decrease gradually in width as they approach the MZI arms 350. The Y-branch coupler 310 comprising the Y-branch segments 320 has very low input loss. The two-section coupler 360 comprising the evanescent couplers 365 also has very low loss. As such, the optical switch 300 maintains a low total loss, below 0.5 dB in silica waveguides.

The Y-branch coupler 310, the MZI 355, and the evanescent couplers 365 comprising the optical switch 300 of FIG. 3 are capable of being constructed from planar waveguides according to well-known fabrication techniques as described above with respect to the optical switch 200 of FIG. 2.

The upper and lower branches of the optical switch 300 both comprise substantially similar means for causing phase shifts, the phase shifters 340, in order to maintain symmetry. By maintaining the upper and lower branches symmetrical in this regard, it is possible to maintain a relative phase shift between the upper and lower branches of an optical switch that is substantially small when the optical switch is in its power-off (un-powered) state as described above for the optical switch 200 of FIG. 2.

The optical switch 300 is highly tolerant to wavelength, polarization, and fabrication (WPF) changes. The Y-branch coupler 310, itself, maintains a highly accurate power splitting ratio (50/50) and phase difference (zero) between its branches 312 regardless of WPF changes. The two-section coupler 360 also gives a highly accurate power splitting ratio (50/50) but must be oriented such that the evanescent coupler with the longer path length (illustratively evanescent coupler 365$_1$) is closest to the Y-branch coupler 310 to ensure an accurate phase difference between the upper and lower arms of the optical switch 300 and thus achieve an accurate power-off state.

An input optical signal to the optical switch 300 experiences very low loss in the Y-branch coupler 310. The input optical signal is split in the Y-branch coupler 310. A portion of the input optical signal propagates through the upper arm 350$_1$ of the MZI 355 and the upper branch 370 of the two-section coupler 360 and a portion of the input optical signal propagates through the lower arm 350$_2$ of the MZI 355 and the lower branch 380 of the two-section coupler 360 wherein the signals undergo relative phase shifts such that only one of the portions of the input optical signal is output through one of the output ports 375, 385 of the optical switch 300. The optical switch 300 of the present invention provides an integrated optical switch that comprises low thermo-optic power consumption, low loss, and high tolerance (i.e., low sensitivity) to wavelength, polarization, and fabrication (WPF) changes.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A multi-section optical coupler, comprising:
   at least three substantially similar optical couplers, adjacent ones of said optical couplers interconnected via at least one set of waveguides, each of said sets of waveguides comprising a path-length difference between the waveguides therein, wherein the path-length differences are chosen so as to minimize wavelength, polarization, and fabrication sensitivity of said multi-section optical coupler for a desired power splitting ratio, and wherein said path-length differences are on the order of an optical wavelength of an optical signal traversing said set of waveguides.

2. The multi-section optical coupler of claim 1, wherein said multi-section optical coupler comprises at least two arms and wherein said path-length differences are adjustable such that signals traversing said at least two arms undergo a relative phase shift, such that a desired output power splitting ratio for said multi-section optical coupler is achieved.

3. The multi-section optical coupler of claim 1, wherein said at least three optical couplers each have a nominal 50/50 splitting ratio.

4. The multi-section optical coupler of claim 1, wherein said path-length differences are adjusted by varying the relative lengths between the waveguides of said sets of waveguides and wherein said multi-section optical coupler may be used as an optical switch.

5. The multi-section optical coupler of claim 1, further comprising a means for causing a controllable phase shift located within at least one of said waveguides of each of said sets of waveguides.

6. The multi-section optical coupler of claim 5, wherein said path-length differences are adjusted by altering the relative phases between said waveguides of said sets of waveguides using said means for causing a phase shift.

7. The multi-section optical coupler of claim 5, wherein said means for causing a phase shift comprise optical phase shifters.

8. The multi-section optical coupler of claim 1, wherein said optical couplers comprise evanescent couplers.

9. The multi-section optical coupler of claim 1, wherein said optical couplers are constructed in planar waveguide technology.

10. A multi-section optical coupler, comprising:
    at least three substantially similar optical couplers, adjacent ones of said optical couplers interconnected via at least one set of waveguides, each of said sets of waveguides comprising a path-length difference between the waveguides therein, wherein the path-length differences are chosen so as to minimize wavelength, polarization, and fabrication sensitivity of said multi-section optical coupler for a desired power splitting ratio, wherein said path-length differences are chosen by solving the following equations:

$$R = \frac{1}{8}|1 + e^{j\phi_2} - e^{j\phi_1} + e^{j\phi_1 + j\phi_2}|^2,$$

[1+cos φ$_2$−cos φ$_1$+cos(φ$_1$+φ$_2$)][−1−cos φ$_2$−3cos φ$_1$−cos(φ$_1$+φ$_2$)]=−[sin φ$_2$−sin φ$_1$+sin(φ$_1$+φ$_2$)][−sin φ$_2$−3sin φ$_1$−sin(φ$_1$+φ$_2$)]

wherein R depicts a coupling ratio of the multi-section optical coupler, and φ$_1$ and φ$_2$ depict phase differences corresponding to said path-length differences.

* * * * *